United States Patent [19]

Howes et al.

[11] 3,966,396

[45] June 29, 1976

[54] TEXTILE PRINTING PROCESS AND TRANSFER MEDIUM

[75] Inventors: Bruce Howes, South Salem, N.Y.; Thomas K. Holland, Paris, France

[73] Assignee: F. P. Licensing Co., Inc, New York, N.Y.

[22] Filed: Dec. 18, 1974

[21] Appl. No.: 533,862

[52] U.S. Cl. .............................. 8/2.5 A; 73/150 R; 96/30; 101/211; 101/470; 428/211; 428/914

[51] Int. Cl.[2] ........................ D06P 1/00; B32B 9/06; B41M 3/12; G03F 7/02

[58] Field of Search ........... 101/211, 136, 450, 463, 101/470; 73/150 R, 159; 8/2.5; 96/30; 428/914, 195, 211; 427/148, 152

[56] References Cited

UNITED STATES PATENTS

| | | | |
|---|---|---|---|
| 1,940,931 | 12/1933 | Young | 101/211 |
| 2,021,418 | 11/1935 | Huggins et al. | 8/2.5 |
| 2,111,068 | 3/1938 | Huebner | 101/211 X |
| 2,580,576 | 1/1952 | Myers, Jr. | 101/211 |
| 2,911,280 | 11/1959 | Cicogna | 8/2.5 |
| 3,053,181 | 9/1962 | Jorgensen | 101/211 X |
| 3,093,071 | 6/1963 | Taylor | 101/170 x |
| 3,419,413 | 12/1968 | Euforbia | 427/288 X |
| 3,464,779 | 9/1969 | Collez | 8/14 |
| 3,647,503 | 3/1972 | Mizutani | 427/148 X |
| R27,892 | 1/1974 | Blake | 101/470 |

*Primary Examiner*—William A. Powell
*Assistant Examiner*—Thomas Bokan
*Attorney, Agent, or Firm*—Natter & Natter

[57] ABSTRACT

An offset process for printing multicolor patterns on fabric. The method involves the photographic preparation of out-of-balance, halftone, color separations and the photoengraving of planographic printing plates for producing a out-of-balance ink dot pattern on a support or transfer medium. The out-of-balance dot pattern compensates for vapor phase expansion of the ink dots upon subsequent transference to the fabric. The pattern is transferred from the transfer medium by pressure contact at its interface with the fabric and upon the simultaneous application of heat for a prescribed time duration, which causes the ink dots to sublimate into the fabric and thereby imprint a continuous tone, multicolor pattern on the fabric. Further correction factors are introduced to compensate for sublimation characteristics of particular ink color pigmentations and for increasing color contrast.

16 Claims, 3 Drawing Figures

TEXTILE PRINTING PROCESS AND TRANSFER MEDIUM

Field of the Invention

The invention relates to a method of textile printing. In particular, the invention is directed to a printing process for reproducing multiple color images and patterns on fabric and especially to a transfer printing process using planographic printing plates.

The process of this invention utilizes an offset printing procedure including the transposition of an intermediate dot pattern onto a fabric to form a continuous tone pattern.

Description of the Prior Art

The most commonly used commercial textile printing process is roller printing wherein the cloth is fed on a roller and is pressed into direct contact with one or more engraved rollers. The engraved rollers contain a dye or color ink which is taken up by the cloth to produce the desired image. The quality of the printed goods by this former method is dependent on various factors such as the pressure between the several rollers, the quantity of ink on the rollers, and the proper registration of the rollers.

Another somewhat slower and more expensive process of printing piece goods is screen printing. There are, of course, many other methods of printing textiles; however, a distinct disadvantage of many of these prior art textile printing methods is the fact that the images produced are frequently muddy and lack purity and richness. Furthermore, transparency of color and clear blooming shades are not obtainable. The process of the invention overcomes these disadvantages and provides a transfer method for the printing of textiles with vivid, four-color patterns in fine detail.

With regard to transfer printing methods for use with textiles, a system is presently known wherein a transfer sheet is printed by a gravure printing method and subsequently transferred to a fabric through the application of heat. This method utilizes a printing plate which has recesses or intaglio forming wells or cells in the plate which are later inked and then transferred to the fabric. For this purpose, the rotary gravure presses have a printing cylinder with an etched copper printing plate and further employ a doctor blade to wipe superfluous ink from the surface of the plate. A web or sheet is fed directly into contact with the printing plate cylinder; the quantity of ink deposited on the sheet or web will be dependent on the depth of each cell and the amount of ink contained therein for producing various tones. The nature of this process provides for heavy laydown of ink without precise quality control. This is a distinct disadvantage, especially because the sheet or other printed media is then used for transferring the image to a fabric and thereby introduces additional problems in obtaining a sharp and clear pattern. Additionally, these prior art methods did not take into consideration adjustment for expansion during sublimation, when preparing the printing plate, nor did these processes provide corrections to overcome limitations of the ink pigmentation or increasing color contrast during vapor phase transfer. Furthermore, the rotary press used in gravure printing employs printing plate cylinders of relatively small diameter and width in comparison with the printing plate cylinders which can be accommodated in rotary offset presses. The gravure printing process, therefore, can not be adapted for printing large patterns since such patterns will be limited by the circumferential surface area of the plate cylinder. These limitations are not present in the rotary offset press or flat-bed offset press encompassed by this invention.

BRIEF DESCRIPTION OF THE INVENTION

This invention concerns a process for multicolor printing on textiles. The method of this invention is directed to an application of offset lithography for printing a pattern on a transfer medium, which pattern is subsequently transferred to a fabric through the simultaneous application of heat and pressure.

The printing procedure of this invention involves photographically reducing an original pattern into four separate color negatives and encompasses the application of a density compensation factor to produce out-of-balance color separations. These separate negatives are further projected through a halftone grid or screen to produce a dot pattern on a halftone positive, wherein the sizes of the dots correspond to the compensated film density at selected areas on the negative. As an additional means for assuring a corrected density, comparisons on the halftone positive are made with a modified Gray scale.

A planographic printing plate is then photoengraved using each of the halftone screened positives and these plates are then employed in an offset rotary press for printing a four-color dot pattern in registration on a support or transfer medium. The ink will be deposited in beads corresponding to the out-of-balance dot pattern. In a subsequent transfer printing operation, preferably utilizing a web-fed, rotary offset press, the transfer medium and a supply of fabric are fed simultaneously through a heat press; the ink is then released from the beads and is impregnated into the fabric. It has been found that this transfer procedure causes a merging through expansion of the individual ink beads in a vapor phase to thus form a continuous tone pattern in the fabric.

An important aspect of this process is the removal of contaminants from the ink reaching the engraving plates. For this purpose, the offset rotary press is modified by reducing the tolerances between the ink rollers to maintain increased contact pressure for more effectively eliminating impurities from the ink.

A further feature involves the introduction of compensating ink control to overcome limitations in the ink pigmentations for the particular optimum sublimation temperatures for each color at which the inks chemically react for maximum color vividness.

A resultant advantage, therefore, of this procedure is that the pattern printed will be in fine detail in clear, sharp and rich colors.

Another advantage of this process is that an exact facsimile of an original pattern can be reproduced in multiple colors efficiently and economically.

A further feature of this printing method includes the introduction of a testing means for quality control. A travelling flat-bed heat press has been incorporated into the rotary press printing operation for obtaining periodic samples of the transferred pattern prior to take-up of the transfer medium. The application of a travelling press does not require interruption of the continuous web-feeding rotary press operation while taking such samples.

Having thus summarized the invention, it will be seen that an object thereof is to provide a process for printing on textiles of the general character described herein which is not subject to the disadvantages of the prior art.

Specifically, it is an object of the instant invention to provide a method for printing on textiles utilizing the high production and low cost economy of a web-fed rotary offset press.

Another object of this invention is to provide a process for printing on textiles which reproduces precise four-color patterns in fine detail on fabric by using a lithographic printing procedure.

A further object of this invention is to provide a system for printing on textiles which utilizes out-of-balance, halftone separations.

An additional object of this invention is to provide a method for printing on textiles which includes the steps for transferring an out-of-balance dot pattern to a transfer medium and then to a fabric whereby a continuous tone pattern is imprinted on the fabric.

Still another object of this invention is to provide a method for printing on textiles which includes a step for quality control sampling without the interruption of continuous production of a rotary press.

BRIEF DESCRIPTION OF THE DRAWINGS

In the accompanying drawings in which is shown one of the various possible embodiments of the invention.

DETAILED DESCRIPTION OF THE INVENTION

Figure 1:
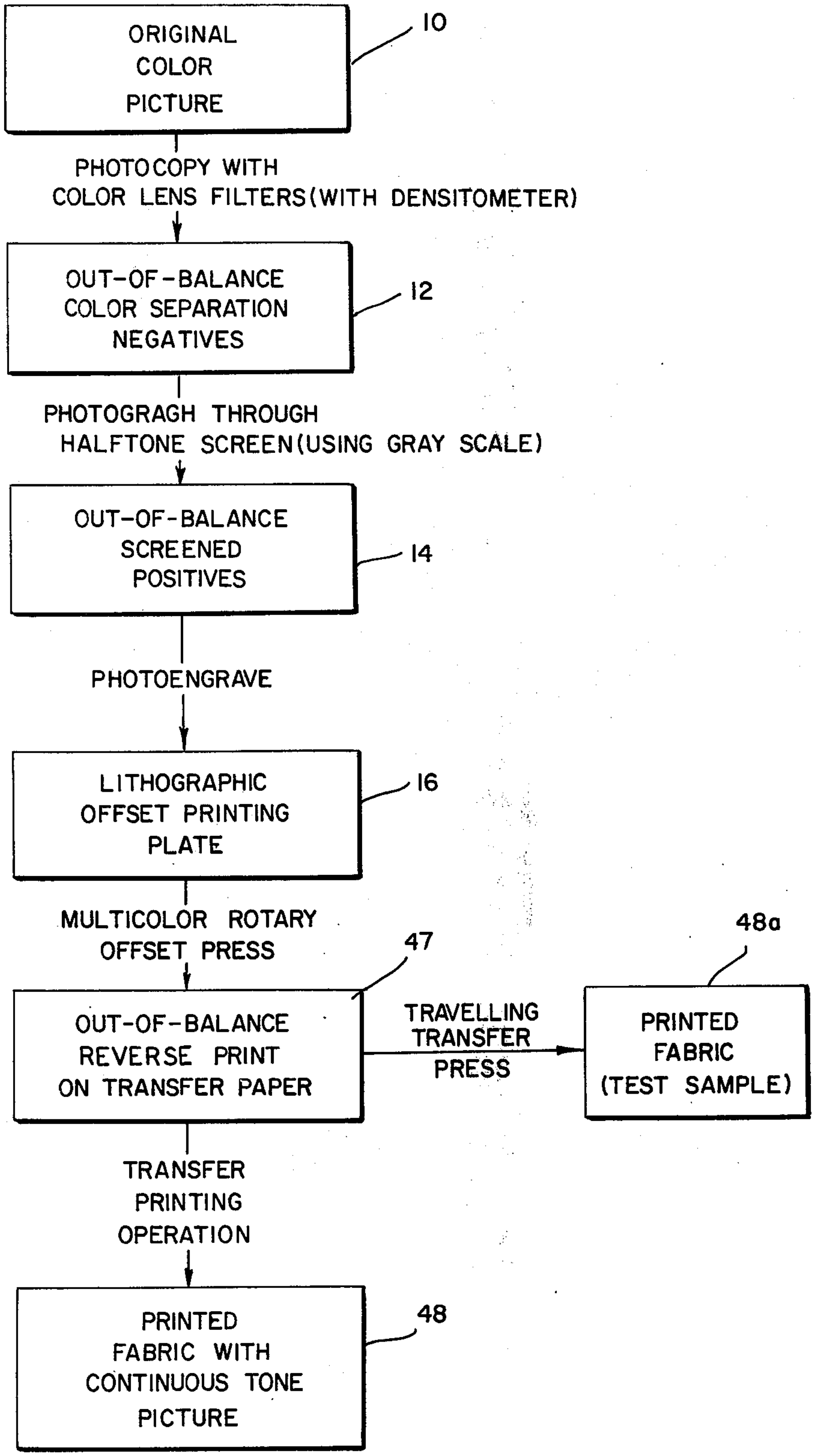
FIG. 1 is a schematic flow diagram of a process for printing multicolor patterns on fabrics in accordance with this invention.

Referring now in detail to the drawings, FIG. 1 represents a flow diagram of the multiple color printing process of this invention. As illustrated in FIG. 1, the initial step of this printing procedure involves photographically breaking down an original color pattern or transparency which, incidentally, may be a painting, photograph, picture or similar indicia, into separation negatives 12. This is accomplished through the use of a copying camera and color lens filters which permit transmission of only selected color light. The preferred color separations are yellow, red, blue and black; and four corresponding negative separations are thus obtainable. It should be apparent that the number and combinations of color separations can be varied. For the purposes of this preferred system, it will be described using the above mentioned four-color combination. Accordingly, standard lens filters, such as the "Wratten" filter may be used for separating the desired colors. In addition, the black separation may be accomplished by the use of a split filter, i.e. using three or more filters at one time with varying exposures, or through the use of a single filter such as "Wratten No. 8" or an infrared filter such as "Wratten No. 88*a*". Since the sensitivity of the film, as well as the light transmitting ability of the film emulsions varies with each of the colors, it is conventional to individually regulate the exposure time for each of the separations to obtain balanced separation negatives. The separations can also be balanced by control of the developing time. In order to determine the proper exposure time and/or developing time for balanced separations, density readings are taken in selected highlight, midtone, and shadow areas on the transparency 10. The instrument used to obtain these readings is a densitometer, and accepted standards have been established for the values in these selected areas in desired color separations. These balanced color separation negatives are then used for making a printing plate wherein the pattern as printed will be represented by dots closely approximating the colors and shades of the original transparency.

The present invention, in contrast to the conventional methods, uses a corrected or out-of-balance color separation 12. This is an important and necessary feature of this process which involves lithographic printing wherein a pattern of dots or beads of dye as printed is subsequently transferred into a textile. It has been found that an inherent characteristic of the chemical compositions of these dyes effects a rapid expansion and sublimation into a gaseous or vapor phase state upon the simultaneous application of heat and pressure during the transference. Consequently, it has been determined that a compensation factor must be introduced into the printing process in anticipation of these conditions. The out-of-balance separation 12 provides for increased spacing between the dots as printed; this correction factor is tailored in accordance with the sublimation characteristics of each color dye. Accordingly, when preparing the corrected color separation 12, the standard densitometer readings have been reduced in proportion to the expansion or explosion factor of the particular dye or ink which is used, and consequently the film emulsion on the separation negatives produced in this process will automatically be adjusted to provide adequate spacing or dispersion between the dots or beads of ink.

By way of example, a schedule of the standard densitometer readings, as taken with a McBeth densitometer, for balanced color separation negatives is as follows:

| Color | Highlight | Midtone | Shadow |
|---|---|---|---|
| Yellow | 180 | 115 | 55 |
| Red | 180 | 120 | 60 |
| Blue | 180 | 100 | 40 |
| Black | 220 | 140 | 70 |

In accordance with the present invention, for optimum results the readings for yellow should be reduced by about 80%, since it has been found that the yellow dot will expand about five times its original size; correspondingly, the red readings should be reduced by about 67%, the blue by about 67%, and the black by about 50%

A revised schedule of densitometer readings pursuant to the process of this invention is as follows:

| Color | Highlight | Midtone | Shadow |
|---|---|---|---|
| Yellow | 36 | 23 | 11 |
| Red | 60 | 40 | 20 |
| Blue | 60 | 33 | 13 |

-continued

| Color | Highlight | Midtone | Shadow |
|---|---|---|---|
| Black | 110 | 70 | 35 |

By reducing the readings, the light intensity transmitted by the resultant corrected or out-of-balance negative 12 is thus proportionately diminished.

The sublimation ink or dyes that are used in heat transfer printing operations reach their full potential and are chemically reactive at particular temperature ranges and for specified time durations. These variables are dependent on the particular dye or ink pigmentation. It has been determined that the ideal intensity of color or optimum vividness due to the density of the dye transferred during the vapor phase can be approached by increasing the temperature within these specified ranges. However, as the density of color increases, detail is lost because of the expansion of the dyes which vary directly with increased temperature. A further problem to be considered is the fact that black and blue color dyes usually mature or bloom at temperatures which are at the higher end of the temperature range than the lighter colors such as yellow or red. It has been found that red and yellow dyes produce optimum color intensity in a temperature range of 340°F. to 430°F., while black and blue reach their optimum color intensity at 385°F. to 465°F. A compensation factor by way of the out-of-balance separation has been introduced into this process for correcting detail which may be lost due to the expansion of the dyes. A further adjustment must be introduced in connection with blue and black inks wherein the amount of ink has been increased to a maximum printable without change in the dot structure. This increase in the amount of ink provides more ink available for release in the vapor phase at the lower temperature range. Thus, for four-color printing in red, yellow, blue and black as above described, a median temperature of 385°F. was selected and achieved satisfactory results.

The foregoing revised densitometer readings may be further modified as in the event greater contrast is necessary. For example, if the transparency 10 contains heavy shadow areas or an out of focus background or a dark blue sky, a greater quantity of black or blue ink is applied to the printing plates to bring out this contrast, since it would be undesirable to raise the temperature as this would adversely affect the detail produced by the lighter color inks. Consequently, by increasing the densitometer readings for blue and black, the transmitted light is intensified and the size of the resultant dots on the corresponding separation negatives will be enlarged to accommodate a greater amount of ink. Further, during the vapor phase transfer there will be an overrun or blending of the dark colors providing a greater color density on the fabric. In this manner, the fine detail will be retained as before in the light colors and the color contrast will be increased because of the higher intensity of the dark color printing. Additionally, it should be mentioned that it is important to maintain a requisite temperature range maximum since too high a temperature will adversely affect the thermal setting of the fabric which would cause the cloth to lose its soft hand. In the above described examples the transfer printing was formed on a fifty denier 100% polyester fabric maintaining a contact pressure of 70 p.s.i. for 28 seconds.

After the out-of-balance separation negatives 12 have been produced, the next step is to project each of the negatives photographically through a halftone grid or screen for producing a dot pattern on a screened positive or halftone separation 14. The halftone screen consists of a transparent grid or network of fine lines at right angles to each other. The screened positive 14 will consist of a plurality of dots uniformly spaced corresponding in size to the light intensity through the out-of-balance negative 12 and capable of reproducing the highlight and shadow areas including gradations of tone therebetween. Halftone screens are available which have various multiples of lines such as 65, 85, 100, 120, 133, etc. It has been found that the best results are obtainable when a 150 line screen is used. Such a screen will produce 22,500 dots per square inch. This relatively large quantity of dots will produce a sharp, clean, continuous tone image when printed on the textile.

In order to insure accuracy and precision in the screening, the four respective separation positives 14 are visually checked by comparison with a modified or revised Gray scale. The conventional Gray scale is comprised of a film strip divided into ten segments with each segment having dot patterns with progressively increasing (or decreasing) dot sizes or concentrations between a 0% dot to a 100% dot concentration thus providing ten distinct tone gradations or a black to white wedge. In accordance with the compensating features introduced into this process, the conventional Gray scale has been modified to now include ten tone gradations with the span of the previous 0% to 50% dot concentration. It should be apparent that whereas the middle tone value or fifth tone gradation of the conventional Gray scale would read a 50% dot concentration as the midtone value, this 50% dot is now the shadow tone value as revised for the black. The tonal values in each of the colors is reduced proportionally in accordance with the percentage reductions used in connection with the densitometer readings. For example, the tonal readings for yellow are read from highlight to shadow tones based on the first 20% of the revised Gray scale; the red and blue tonal values are read on approximately the first 70% of the revised Gray scale, and the black is read on the complete tent gradations of the revised Gray scale.

The screened or halftone separations 14, in the form of positive transparencies, are used for photoengraving a work image, comprised of a system of graduated dots, on a lithographic halftone printing plate 16 with the image and nonimage areas being on the same printing surface. The plates 16 are preferably made of zinc, aluminum, copper or a combination of these metals. The planographic method of printing with an offset or indirect lithographic plate 16, having coplanar printing and nonprinting areas, is another important feature of this invention and compatible with the desired printing procedure involving the use of a high-speed, web-fed, multicolor, offset, rotary press.

It should be noted that although the preferred embodiment describes a process using an offset rotary press, the process may be practiced on an offset, flatbed press. Additionally, the press may be sheet-fed or roll-fed.

Gravure printing, in contrast, encompasses the use of an engraved printing plate wherein a multiple of minute cells are formed below the surface on the printing plate. The depth and size of these cells determine the amount of ink that will be available for transfer to a printing surface. This type of engraved plate does not provide dots of ink as with the lithographic plate, and consequently there is less control over the amount of ink deposited on the printing surface. In fact, this intaglio or recessed plate permits a heavy ink laydown; the resultant image as printed, especially a nonlinear pattern, is not as sharply defined and colors are not as clean and bright.

Figure 2:
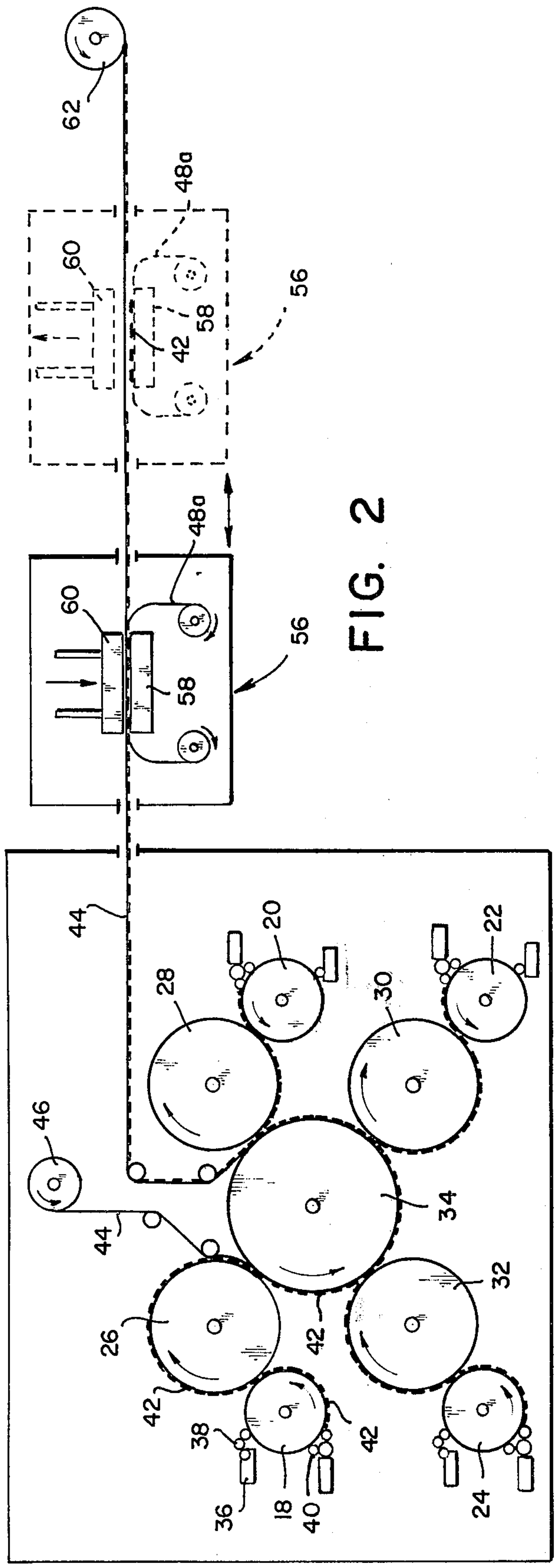
FIG. 2 is a schematic sectional view of a four-color, web-fed, rotary offset system and travelling flat-bed transfer printing press with the latter being shown by dashed lines in a laterally displaced station as after having completed a test sample.

In accordance with this invention, a four-color press is used and has been shown schematically in FIG. 2. Separate printing plates 16, made from each of the screened separation positives, are individually affixed to a plate cylinder 18, 20, 22, 24, for rotation and are positioned tangentially to a rotatable offset or blanket cylinder 26, 28, 30, 32, which in turn are in movable contact with an impression cylinder 34. The directions of rotation are indicated by the arrows on the drawings. Typically, the printing operation will be described with respect to one plate cylinder 18.

The nonimage portion on the printing surface of the plate 16 is receptive to moisture but repellent to ink, whereas the work image portion is receptive to ink but not to moisture. Accordingly, the plate cylinder 18 is first treated with a wetting solution 36 through the use of moistening rollers 38. A plurality of inking rollers 40 then supply a color dye or ink 42 which is received only on the work image area and is depicted by dashed lines on the drawing. The preferred ink used for this purpose is an offset transfer ink such as those manufactured by Sinclair and Valentine Co.. It should also be mentioned at this point that the ink contacting the plate cylinder 18 should be free from contamination. It has been determined that the use of a plurality of oversized ink rollers having an increased diametrical width decreases the tolerance between rollers and increases the contact pressure therebetween. This is effective in eliminating or reducing ink impurities from reaching the plate cylinder 18.

As the plate cylinder 18 rotates, it contacts an offset or blanket cylinder 26 which is preferably fabricated of a resilient or elastic material, and a positive inked image in the form of a dot pattern is impressed upon the offset cylinder 26. The amount of ink deposited will vary directly with the size of the dots and ink film thickness as determined by the halftone plate 16. It should be apparent that this type of rotary offset printing from photoengraved plate cylinders provides for a large multiple of dots and therefore permits precise control of the quality. It should also be noted that each of the plate cylinders 18, 20, 22, 24 receives a distinct color ink.

The image is then transferred from the offset cylinder 26, as a reversed image, onto a support or transfer medium 44 such as paper fed from a supply roller 46 (e.g. 60 lb. dull coated offset stock). As the transfer medium or paper 44 passes between the impression cylinder 34 and each of the blanket cylinders 26, 28, 30, 32, respective color dyes or inks are deposited superimposed in registration on the paper 44 to print a reverse image dot pattern 47 in accordance with the out-of-balance screened separation positives which were used to photoengrave the plate cylinders. The dots of ink adhere to the paper 44 in the form of encapsulated droplets or in bead form.

Figure 3:
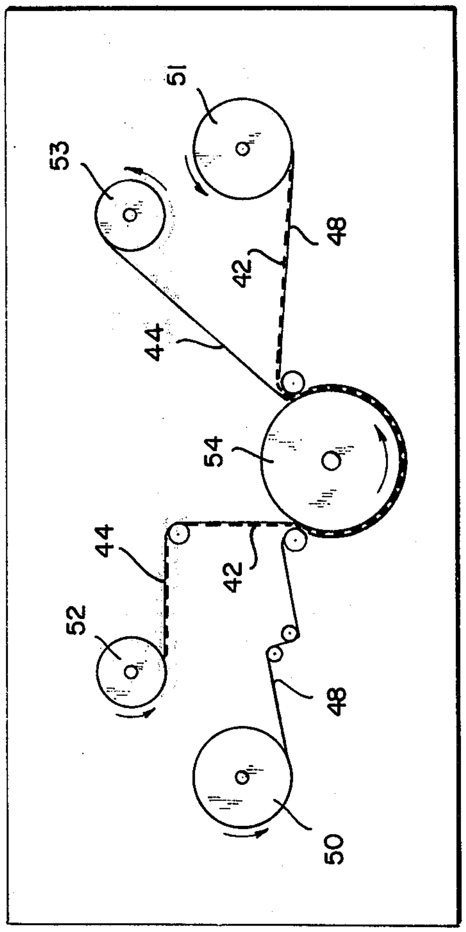
FIG. 3 is a schematic sectional view of a transfer printing press showing the simultaneous feeding of the transfer medium and fabric supply to the heat press and the take-up of the printed fabric.

FIG. 3 illustrates schematically a transfer printing operation wherein the inked images are transferred to a fabric 48 fed from a roller 50 onto a roller 51. The process has been found especially effective when the fabric is a polyester, a polyester blend, or nylon; it also imprints on treated cotton goods. The transfer paper 44 is delivered from a roller 52 to a roller 53 with the ink dot pattern in confronting relationship to the fabric 48. The paper 44 and fabric 48 then travel around a rotary heat press 54 which applies pressure between the paper 44 and fabric 48 in the range of 60 to 90 p.s.i., preferably 70 p.s.i., at a temperature between 375°F. and 410°F., with 385°F. being preferred, for a duration of 15 to 30 seconds with 28 seconds being the optimum time. Under these conditions, it has been found that the ink dot images 46 expand and merge into the fabric 48 in accordance with the particular characteristics of each color dye which have been previously taken into consideration by the out-of-balance separation positives. For example, the yellow dots expand approximately 500%, the red dots expand approximately 300%, the blue dots expand approximately 300%, and the black dots expand approximately 100%. A resultant, positive, continuous tone, four-color pattern is thus formed in the fabric 48 and will be an accurate facsimile of the original.

In order to insure quality control in this offset printing procedure and to determine if proper inking with uncontaminated dyes has been effected during the printing process, a measure has been included for testing the ink dot image on the transfer paper 44 without interrupting the continuous rotary press operation. This is achieved through the use of a flat-bed travelling transfer press 56. The transfer press 56 has a flat-bed 58 and a movable press heating plate 60 which supplies heat at approximately 385°F. and 70 p.s.i. of pressure for about a 20 second duration.

In operation, periodically or when otherwise desired, a segment of a fabric 48*a* is positioned on the bed 58 and the plate 60 is released to initiate the transference of the ink dot pattern 46 to the fabric 48*a*. The transfer press 56 will move from an initial station as on a track at the same rate of speed as the paper 44 to a laterally displaced station (shown in dashed lines). The press 60 is then raised to permit the paper 44 to continue moving and be rewound on a take-up reel 62. The duration of time in which the transfer press 56 moves between the span between the initial and displaced station is about 20 seconds. The distance of this span can be lengthened or shortened relative to the web speed of the paper 44 in order to achieve an adequate time duration for the imprinting of the fabric 48a. The imprinted fabric 48a can then be removed and examined to ascertain whether the ink has been contaminated, the colors are in proper registration, or if any other printing malfunctions are present.

The above described printing system, as well as the resultant printed fabric, is intended as exemplary; and while it has described the invention with specific implementation procedures, other modifications and various changes might be made to the process as so set forth and will be apparent to those skilled in the art.

It should therefore be understood that all material described or shown in the accompanying drawings is to be interpreted as illustrative and not in a limiting sense.

Having thus described the invention there is claimed as new and desired to be secured by Letters Patent:

1. An offset process for multiple color printing in ink dyes of an original pattern to a true likeness comprising the steps of:

copying the pattern photographically through color filter lenses to produce separate negatives in each of the respective colors desired, regulating exposure and developing variables for the separate negatives to achieve selected film emulsion densities on the respective negatives, said densities being reduced from a standard balanced negative to define an out-of-balance negative, projecting the out-of-balance negatives through a halftone screen for uniformly dividing the pattern into a plurality of dots corresponding in sizes to the intensity of light transmission through the film emulsion to form respective halftone positive dot patterns reduced in size in proportion to the respective ink transfer sublimation characteristics, photoengraving each of the halftone positive dot patterns respectively on a corresponding lithographic plate, printing the dot patterns respectively on a transfer medium corresponding to that on the lithograph plates by depositing ink dyes in the respective colors from each of the plates, transferring the dot pattern from the transfer medium onto a fabric through the application of heat and pressure to form a continuous tone pattern.

2. An offset process for multiple color printing on textiles as claimed in claim 1 wherein the dot pattern on the transfer medium is comprised of beads of inks as deposited from various engraving plates in a superimposed registered pattern.

3. An offset process for multiple color printing on textiles as claimed in claim 1 wherein the dot pattern on the transfer medium is transferred onto the fabric by the simultaneous application of heat and pressure effective to cause the ink to expand and merge into the fabric to form a continuous tone pattern in true likeness to the original pattern.

4. An offset process for multiple color printing on textiles as claimed in claim 3 wherein the heat applied during the transferring step is in the range of 375° to 410°F. with a pressure of approximately 60 to 90 p.s.i. for a duration of from about 15 to 30 seconds.

5. An offset process for multiple color printing on textiles as claimed in claim 1 wherein the film emulsion density at selected highlight, midtone and shadow areas on the separation negative is reduced from standard readings to achieve an out-of-balance separation negative.

6. An offset process for multiple color printing on textiles as claimed in claim 5 wherein each of the separation negatives is projected through a 150 line halftone screen producing a halftone positive having 22,500 dots per square inch.

7. An offset process for multiple color printing on textiles as claimed in claim 1 further including the step of comparing the halftone separation positives in each of four colors with respective Gray scale standards as compensated for between ten gradations from 0% to a 50% dot.

8. An offset process for multiple color printing on textiles as claimed in claim 1 using a web-fed four-color rotary offset press.

9. An offset process for multiple color printing on textiles as claimed in claim 1 wherein ink contamination on the engraving plate cylinders is minimized by increasing the contact pressure between adjacent ink supply rollers by using oversized ink rollers having an increased diametrical width.

10. An offset process for multiple color printing on textiles as claimed in claim 1 further including the quality control step of sampling the dot pattern as printed on the transfer medium during the continuous movement of the transfer medium by means of a travelling transfer heat press.

11. An offset process for multiple color printing on textiles as claimed in claim 1 wherein separate negatives are produced in each of the following colors: yellow, blue, red, and black.

12. A method of textile printing suitable for producing a design formation on a fabric comprising the steps of photoengraving printing plates using an ink dot pattern produced from color compensated halftone positives and having a dot structure reduced in size in proportion to ink transfer sublimation characteristics, applying controlled quantities of ink on the printing plates and dot pattern, transposing the inked dot pattern from the printing plates onto a support medium and then heat transferring the dye from the inked dot pattern in a vapor phase from the support medium onto a fabric whereby the ink dye from the ink dots expand to form a continuous tone pattern.

13. A method of printing as claimed in claim 12 wherein the color compensated halftone positives are photographically produced from out-of-balance separation negatives having selected film emulsion densities for defining areas of reduced intensity light transmission.

14. A method of textile printing as claimed in claim 12 further including the step of compensating for higher sublimation temperature requirements of a particular color ink for optimum transference by increasing the amount of ink on the corresponding printing plate while maintaining the same dot structure to thereby provide a greater quantity of available ink in that color for vapor phase transfer.

15. A method of textile printing as claimed in claim 12 further including the step of improving color contrast by changing the dot structure in selected ink colors whereby only those selected colors are intensified without affecting the detail as printed by the other colors.

16. An article of manufacture comprising a transfer medium having an out-of-balance dot pattern produced by the process as defined in claim 1 and formed thereon with superimposed sublimable dye containing ink beads in registration, said dye in the ink beads being heat-transferable by sublimation onto a textile fabric for providing a continuous tone pattern.

* * * * *

REEXAMINATION CERTIFICATE (676th)

United States Patent [19]

Howes et al.

[11] B1 3,966,396

[45] Certificate Issued May 5, 1987

[54] TEXTILE PRINTING PROCESS AND TRANSFER MEDIUM

[75] Inventors: Bruce Howes, South Salem, N.Y.; Thomas K. Holland, Paris, France

[73] Assignee: F. P. Licensing Co., Inc., New York, N.Y.

Reexamination Request:
No. 90/000,916, Dec. 6, 1985

Reexamination Certificate for:

| | |
|---|---|
| Patent No.: | **3,966,396** |
| Issued: | **Jun. 29, 1976** |
| Appl. No.: | **533,862** |
| Filed: | **Dec. 18, 1974** |

[51] Int. Cl.[4] .......................... B41M 3/12; D06P 1/00; D06P 5/20; G03F 3/10

[52] U.S. Cl. .............................. 8/471; 8/472; 8/932; 101/211; 101/463.1; 101/471; 428/914; 430/201; 430/301; 430/305

[58] Field of Search .................... 8/471, 472; 430/200, 430/201, 301, 305

[56] References Cited

U.S. PATENT DOCUMENTS

| | | | |
|---|---|---|---|
| 1,965,257 | 7/1934 | Poschel | 41/33 |
| 2,244,992 | 6/1941 | Guerrero | 95/2 |
| 2,842,610 | 7/1958 | Crosfield et al. | 178/5.2 |
| 3,337,343 | 8/1967 | Hove | 96/31 |
| 3,615,441 | 10/1971 | Deneau | 96/30 |
| 4,037,008 | 7/1977 | Tugwell | 428/200 |
| 4,128,395 | 12/1978 | Hadfield | 8/471 |

FOREIGN PATENT DOCUMENTS

| | | | |
|---|---|---|---|
| 1295634 | 11/1972 | United Kingdom | 8/471 |

OTHER PUBLICATIONS

Vellins, C. E.: "Transfer Prints '73–The Current State of the Art", Reprint from *British Knitting Industry,* Jan. 1973, 12 pages.

Jaffee & Preucil, "Color Separation Lithography" published by Graphic Arts & Technical Foundation of Pittsburgh, Pa., 1959, pp. 51–66.

Printing Technology, pp. 71–76, Dec. 1972 "Transfer Printing–How Wide Are Its Applications", A. G. Rennoldson.

American Ink Maker, pp. 22–25, Mar. 1972 "Heat Transfer Printing" A New Ink Market", James E. Renson.

Printing Impressions, Jun. 1973, pp. 16, 18, 39, "The Fine Line Between Good Color and Bad Color", Miles Southworth.

*Primary Examiner*—Dennis L. Albrecht

[57] ABSTRACT

An offset process for printing multicolor patterns on fabric. The method involves the photographic preparation of out-of-balance, halftone, color separations and the photoengraving of planographic printing plates for producing a out-of-balance ink dot pattern on a support or transfer medium. The out-of-balance dot pattern compensates for vapor phase expansion of the ink dots upon subsequent transference to the fabric. The pattern is transferred from the transfer medium by pressure contact at its interface with the fabric and upon the simultaneous application of heat for a prescribed time duration, which causes the ink dots to sublimate into the fabric and thereby imprint a continuous tone, multicolor pattern on the fabric. Further correction factors are introduced to compensate for sublimation characteristcs of particular ink color pigmentations and for increasing color contrast.

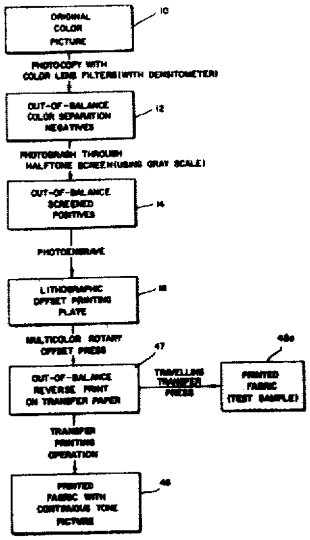

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 12 are determined to be patentable as amended.

Claims 2-11 and 13-16, dependent on an amended claim, are determined to be patentable.

1. An offset process for multiple color printing in ink dyes of an original pattern to a true likeness comprising the steps of:

copying the pattern photographically through color filter lenses to produce separate negatives in each of the respective colors desired, regulating exposure and developing variables for the separate negatives to achieve selected film emulsion densities on the respective negatives, said densities being reduced from a standard balanced negative to define an out-of-balance negative, projecting the out-of-balance negatives through a halftone screen for uniformly dividing the pattern into a plurality of dots corresponding in sizes to the intensity of light transmission through the film emulsion to form respective halftone positive dot patterns reduced in size in proportion to the respective ink transfer *expansion and* sublimation characteristics, photoengraving each of the halftone positive dot patterns respectively on a corresponding lithographic plate, printing the dot patterns respectively on a transfer medium corresponding to that on the lithograph plates by depositing ink dyes in the respective colors from each of the plates, transferring the dot pattern from the transfer medium onto a fabric through the application of heat and pressure to form a continuous tone pattern.

12. A method of textile printing suitable for producing a design formation on a fabric comprising the steps of photoengraving printing plates using an ink dot pattern produced from color compensated halftone positives and having a dot structure reduced in size in proportion to ink transfer *expansion and* sublimation characteristics, applying controlled quantities of ink on the printing plates and dot pattern, transposing the inked dot pattern from the printing plates onto a support medium and then heat transferring the dye from the inked dot pattern in a vapor phase from the support medium onto a fabric whereby the ink dye from the ink dots expand to form a continuous tone pattern.

* * * * *